H. K. RAYMOND.
THREAD OR CORD.
APPLICATION FILED JULY 29, 1910.
1,171,247.
Patented Feb. 8, 1916.
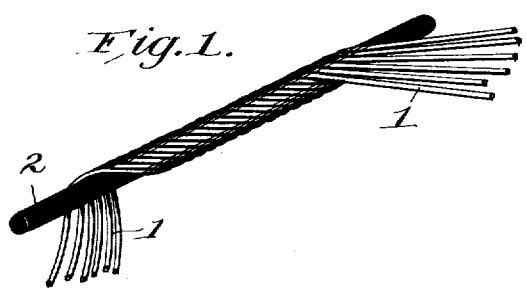
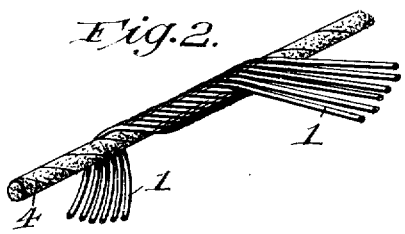
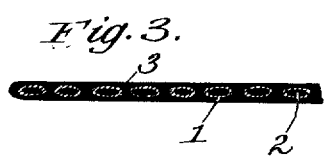
Inventor
Harry K. Raymond,
By Dodge and Sons,
Attorneys

UNITED STATES PATENT OFFICE.

HARRY KING RAYMOND, OF AKRON, OHIO, ASSIGNOR, BY MESNE ASSIGNMENTS, TO THE B. F. GOODRICH COMPANY, A CORPORATION OF NEW YORK.

THREAD OR CORD.

1,171,247.  Specification of Letters Patent.  Patented Feb. 8, 1916.

Application filed July 29, 1910. Serial No. 574,481.

*To all whom it may concern:*

Be it known that I, HARRY K. RAYMOND, a citizen of the United States, residing at Akron, in the county of Summit and State of Ohio, have invented certain new and useful Improvements in Threads or Cords, of which the following is a specification.

My present invention pertains to an improved thread or cord for use in tire construction, and more particularly motor-vehicle tires.

The main object of the invention resides in the production of a cord which is yielding and more or less elastic in its nature, the various constituent elements of which will yield and adapt themselves to the requirements and conditions of the structure of which it forms a component part.

Two forms of the cord and a section of a fabric into which the cords are incorporated are shown in the annexed drawings, wherein:

Figure 1 is a perspective view of a piece of one form of the cord, the outer threads being shown as removed from the ends of the rubber core; Fig. 2 a similar view, illustrating a cord having a soft or yielding core made of a material other than rubber; and Fig. 3 a sectional view of a fabric in which the cords are embedded.

In building up the cords shown in Fig. 1 single threads, as 1, are drawn through rubber cement and such cement is partially dried in a heated chamber. The threads are then twisted or wound around a central core 2, preferably of rubber, either partially vulcanized in order to better retain its form or in a raw state. The finished cord is designed to be wrapped around a mandrel previously covered with unvulcanized rubber, a slight space being left between the various convolutions, in order that the rubber overlying the mandrel may pass between such convolutions. The cords are then spread with cement and a strip of thin rubber is preferably wound over the same to better hold them in position. The structure is then vulcanized and the threads or cords will be flexibly bound together by a surrounding body of rubber, as at 3, in Fig. 3. In lieu of assembling the cords as above, wherein cement is employed, they may be placed between two strips of unvulcanized rubber and subjected to pressure by suitable means, which will force the rubber of the sheets between the cords and, owing to the absence of cement, there will be less tendency for the core of the cords to become soft and squeeze or ooze out from the spirally-wound threads, the cement having a tendency to soften the cord and to permit such action. By the employment of an elastic core or center, there is obtained a cord in which all the threads are twisted under exactly the same tension and are of the same length; or in other words, there are no straight threads or threads whose lengths would be less than that of the majority.

The cord produced in this manner is strong and firm, yet slightly extensible and elastic. This elasticity is afforded by the construction as above set forth, for when the strain is put upon the cord the threads which are spirally wound to form the cord tend to straighten, condensing the elastic core, the cord as a whole becoming slightly less in diameter at such moment. The threads in each cord are in and of themselves substantially inextensible, but the cord as a whole is slightly extensible.

While the core of raw rubber is preferred and in practice is found highly efficient, it is conceivable that a core formed of other material, such as loose or broken cotton, which may be treated with a rubber solution, may be employed. Such a core is indicated at 4 in Fig. 2, and in the main would be substantially the same in its action as the raw rubber core above described.

When the cords are employed in a fabric and the structure as a whole is vulcanized, either after or before being built up into a tire, the rubber of the core and of the facing sheets employed in conjunction with the cords, permeates the threads and the fibers thereof, binding the various cords together and forming in effect a fabric homogeneous throughout.

While I have set forth the fact that the cords may enter into the production of a fabric, forming the major portion thereof, it is to be understood that the cords may be employed separately and placed in the body of the tire, as required, as the same is being built up.

No claim is made herein to the fabric, as such, the same being set forth and claimed in my divisional application Serial No.

602,247, filed on or about the 12th day of January, 1911, Patent No. 1,123,375, issued January 5, 1915, the matter being carried into said application in view of the requirement of the Patent Office.

Having thus described my invention, what I claim is:

1. As a new article of manufacture, a cord having a vulcanizable rubber core, with a series of rubber-coated threads wound spirally around the same in the same direction.

2. As a new article of manufacture, a cord having an elastic core, with a plurality of threads wound spirally around the same in the same direction, the threads having been previously treated with rubber cement.

3. As a new article of manufacture, a cord having a rubber core surrounded by a plurality of threads treated with rubber cement, said threads being wound spirally around the core in the same direction.

In testimony whereof I have signed my name to this specification in the presence of two subscribing witnesses.

HARRY KING RAYMOND.

Witnesses:
ROBERT W. AITKEN,
GEORGE A. SCANLON.